Figure 1:
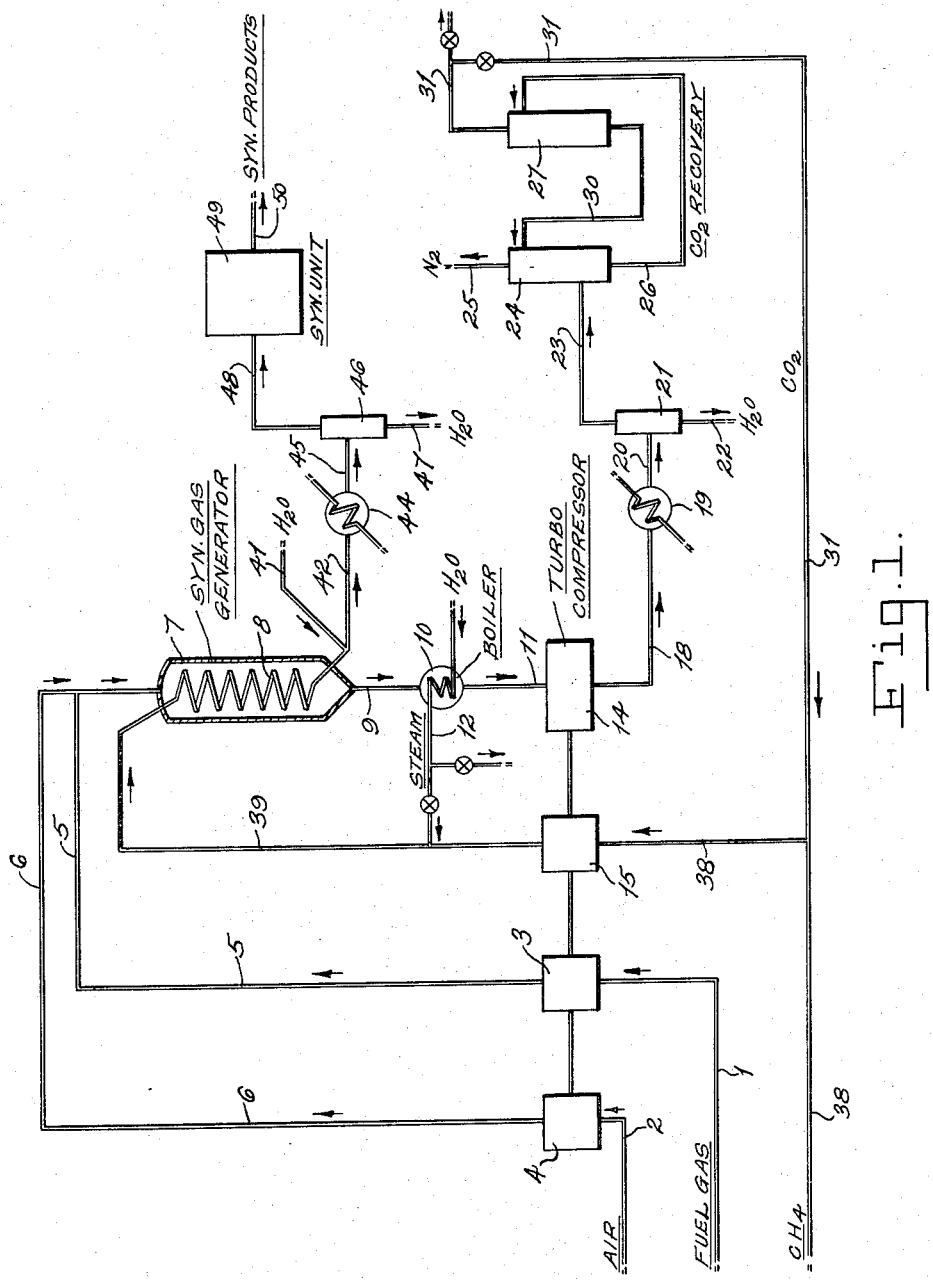

Dec. 8, 1953   L. P. GAUCHER   2,662,004
METHOD OF PREPARING SYNTHESIS GAS AT ELEVATED PRESSURES
Filed Oct. 1, 1948   2 Sheets-Sheet 1

INVENTOR.
LEON P. GAUCHER
BY
ATTORNEYS

Patented Dec. 8, 1953

2,662,004

UNITED STATES PATENT OFFICE 2,662,004

METHOD OF PREPARING SYNTHESIS GAS AT ELEVATED PRESSURES

Leon P. Gaucher, Tuckahoe, N. Y., assignor to The Texas Company, New York, N. Y., a corporation of Delaware Application October 1, 1948, Serial No. 52,324

2 Claims. (Cl. 48—196)

This invention relates to effecting endothermic conversions of gaseous reactants at an elevated temperature and pressure. More particularly, the invention concerns preparing synthesis gas comprising carbon monoxide and hydrogen at an elevated pressure by the reaction of a hydrocarbon gas such as methane with steam or carbon dioxide.

The present application is a continuation-in-part of my copending application Serial No. 677,437, filed June 18, 1946, now abandoned.

The carrying out of endothermic conversions of gaseous reactants at temperatures above about 1200° F. and at pressures above about 150 lbs. per square inch gauge is beset with operating difficulties. Heat must be supplied to fulfill the thermodynamic requirements of the reaction and at the same time the pressure must be maintained at the desired level. If the vessel is constructed so that it can withstand an elevated pressure, then it is difficult to supply the required heat because of the bulky construction of a pressurized vessel. When the construction of a reaction vessel is such that heat may be readily supplied thereto, the vessel ordinarily will not withstand elevated pressures. The method of this invention presents a simple answer to the problems inherent in such operation and obviates the difficulties attendant upon performing endothermic reactions at elevated temperatures and pressures.

In accord with the method of this invention, a carbonaceous material is completely oxidized in a combustion or exothermic zone in a furnace under elevated temperature and pressure. Disposed in indirect heat transfer relationship with this high pressure combustion zone, is an endothermic reaction zone to which the high pressure heat of combustion is continuously transferred to thermally support the segregated endothermic reaction going on therein. The endothermic zone, for example, may be confined or segregated within a tube, a plurality of tubes or a tubular coil, preferably arranged interspatially of the combustion zone so that the confining surfaces of the endothermic zone continually transmit thermal energy to the interior. Alternatively, the pressure combustion zone may extend interiorly through the endothermic zone, as for example, through tubes, ducts or passageways therein. In any event, the endothermic zone is segregated in indirect heat transfer relationship with the pressure combustion zone by virtue of an intervening, impermeable, heat transfer barrier.

Gaseous reactants for the endothermic reaction are introduced into the endothermic zone at an elevated pressure which is substantially equivalent to that maintained in the combustion zone during oxidation of a carbonaceous material therein. Gaseous reactants are converted to desired products at elevated temperature and pressure during their passage through the endothermic zone which may be occupied by a catalyst material. The heat required for the endothermic conversion is supplied by the combustion taking place under pressure within the combustion zone.

The carbonaceous material which is completely oxidized in the combustion zone of the furnace may consist of natural gas, other gaseous fuels, liquid fuels of any type, or a mixture of gaseous and liquid fuels.

Solid fuels, such as coal or coke, may also be burned in the pressure combustion zone, as for example, by injecting them in powdered or particle form in a stream of oxidizing gas.

The method of this invention is most useful in performing endothermic reactions at pressures above about 150 lbs. per square inch gauge and at temperatures above about 1200° F. Many endothermic reactions such as the reaction of methane with carbon dioxide or steam require the maintenance of a temperature level substantially in excess of 1200° F., as for example, in the range of 1500° to 2000° F., in order to effect reaction. When economic or operating considerations dictate that such a reaction be performed at an elevated pressure, this invention provides a practical method of effecting such reaction.

The pressure furnace in which the carbonaceous material is oxidized to supply heat can be of bulky construction with heavy reinforced walls. The walls may be lined with a thick insulating layer of refractory material. Insulation of the furnace with layers of refractory material prevents the outer wall from overheating. By constructing the furnace so that there is no substantial pressure differential through the combustion zone, objectionable leakage of gas through the refractory material is avoided, the development of hot spots in the furnace wall thus being prevented.

A wide choice of heat-resistant alloys are available from which the heat transfer barrier, such as the tube or tubes situated within the pressure furnace, may be constructed. The pressure on either side of the tube wall or barrier is substantially the same and, therefore, there is no necessity for heavy wall construction. The only limitation put upon the structure of such heat transfer surfaces is that they be made of a material which is able to withstand oxidation or reduction at elevated temperatures. Alloys such as the chrome steels are representative of the type of material from which such surfaces or barriers may be constructed.

The endothermic zone may be packed with catalyst in order to increase the rate at which the endothermic reaction occurring therein takes place. The choice of catalyst will depend upon the particular endothermic reaction. Thus, for example, a nickel on alumina catalyst may be used to pack the tube for the reaction between methane and carbon dioxide to produce a mixture of carbon monoxide and hydrogen.

Advantageously, however, from the standpoint of conversion efficiency, the catalyst occupies the endothermic zone as a fluid phase of solid particles.

Thus, it has been discovered that the dense fluid catalyst mass extraordinarily increases the rate of heat transfer to the endothermic zone. Presumably, this follows from the fact that the rapidly vibrating particles of the fluid phase function as heat transfer bodies capable of overcoming the insulatory gas film effect which characterizes heat flow between fluids and heating surfaces. In any event, however, the desired thermal flow into the endothermic zone is remarkably increased, and the contact mass moreover assumes a highly desirable uniformity of temperature which may be controlled at any predetermined reaction temperature by regulating the rate of reactant feed, or the like.

Maintenance of the particles in fluid phase condition may be effected by upflow of the reactants at a suitable linear velocity, or alternatively by subjecting the particles to mechanical aeration, as by an agitator or rotating impeller. Conditions suitable for a dense fluid phase are advantageous in that they permit continuous separation of the product gases from the upper pseudo-liquid level of the contact mass.

The process of this invention is particularly well adapted to the preparation of synthesis gas comprising carbon monoxide and hydrogen by the reaction of a hydrocarbon gas such as methane with carbon dioxide or steam or a mixture of the two; such synthesis gas may then be converted into hydrocarbons, oxygenated hydrocarbons and the like by procedures which are well known in the art. The preparation of synthesis gas by the reaction of a hydrocarbon gas such as methane with carbon dioxide or steam or a mixture of the two is a highly endothermic reaction. The reaction of methane with carbon dioxide in accordance with the following equation,

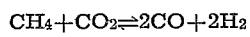

is endothermic to the extent of 2140 B. t. u. per pound of methane at 2241° F. The reaction between methane and steam according to the following equation,

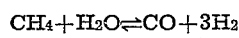

is endothermic to the extent of 1885 B. t. u. per pound of methane at 2241° F.

Both of these reactions require that the temperature level be maintained at or above about 1500° F. in order for the reactions to proceed at an economically feasible rate even if a catalyst is used. Moreover, when the hydrogenation of carbon monoxide in a subsequent step is to be performed at an elevated pressure, considerable economies in compression cost are realized if the preparation of synthesis gas is conducted at elevated pressures. The reason for this lies in the fact that the preparation of synthesis gas by either of the above two equations results in a twofold volume increase which may be readily ascertained from an inspection of the equations aforementioned. Thus, if the reactants rather than the products are compressed, as is the situation when the endothermic conversion is performed at elevated pressures, approximately a 50 per cent saving in compression cost may be realized.

Moreover, by the present invention, the flue gas discharged from the combustion zone at elevated temperature and pressure is utilized to generate power for compression of the feed gases as well as to generate steam for use in the endothermic conversion.

In order that the invention may be more fully described, reference will now be made to the Figure 1 of the accompanying drawing, in which the use of the invention for the preparation of synthesis gas is illustrated.

Fuel gas, such as natural gas, and air obtained from sources not shown, are passed through pipes 1 and 2 respectively to compressors 3 and 4 respectively wherein they are compressed to an elevated pressure of about 250 pounds per square inch gauge. The compressed gases then flow through pipes 5 and 6 to the combustion side of a furnace 7 wherein combustion is effected under about 250 lbs. per square inch gauge and at a temperature within the range of about 1800° to 3600° F.

Oxygen or gas rich in free oxygen may be used instead of air, but an advantage of the process is that air can be used without adding nitrogen to the synthesis gas.

The pressure furnace 7 is constructed to withstand high pressure and temperature levels. It comprises a metal vessel lined with refractory material. It is preferred that the combustion zone be sufficiently unobstructed so that there is substantially no pressure differential between the feed gas inlet and the flue gas outlet.

Within the pressure furnace 7, there is positioned tubing 8 made of high temperature resistant alloy. This tubing is advantageously constructed in the form of a coil so as to minimize structural stress resulting from the differences in the coefficients of expansion of the high temperature resistant tubing and the material of which the pressurized furnace is constructed. This coil is in fluid communication with the exterior of the pressure furnace so that gaseous constituents which react endothermically may be introduced to the coil and discharged therefrom to the exterior of the pressure furnace.

An effluent combustion gas comprising nitrogen, excess oxygen and the products of combustion, namely carbon dioxide and steam, leaves the pressure furnace 7 through a pipe 9 at a pressure of about 250 pounds per square inch gauge. This gas is passed into an exchanger 10 wherein its temperature is lowered from about 2500° F. to about 1000° to 1500° F., giving up its heat to water and thereby generating steam. The steam generated in the exchanger 10 discharges therefrom through a pipe 12 and is used in the methane-carbon dioxide-steam reaction taking place within the coil 8.

The partially cooled gas stream leaves the exchanger 10 through a pipe 11 which leads to a gas turbine 14. The gas turbine 14 drives the compressors 3 and 4 as well as an additional compressor 15 to which reference will be made later. The heat energy of the gas is thus converted into kinetic energy.

The exhaust gas from the turbine passes along a pipe 18 into an exchanger 19 in which the steam present therein is condensed. From the exchanger 19, a fluid stream comprising condensed water and gases such as carbon dioxide, nitrogen and oxygen, passes through a pipe 20 into a gas liquid separator 21. Water is separated from the gaseous constituents and discharged from the separator 21 through a pipe 22.

The gases which have been separated from the condensed water leave the separator 21 through a pipe 23 and are introduced into a scrubber 24 of a carbon dioxide absorption unit. In the scrubber 24, the gases flow countercurrently to an alkaline solution such as an aqueous solution of monoethanolamine whereby the carbon dioxide present in the gas stream is separated therefrom by absorption in the liquid. Unabsorbed gases comprising mainly nitrogen leave the scrubber 24 through a pipe 25 and are vented therethrough.

Monoethanolamine solution saturated with carbon dioxide continuously leaves the scrubber 24 through a pipe 26 and is introduced into a stripper 27. In the stripper 27, monoethanolamine solution is regenerated with the evolution of carbon dioxide. Regenerated solution continuously leaves the stripper 27 through a pipe 30 and is continuously reintroduced into the scrubber 24 therethrough.

Carbon dioxide which is evolved by the regeneration of absorbent solution in the stripper 29 passes along a pipe 31 through which it is introduced all or in part as one of the gaseous reactants which undergo endothermic conversion in the tubing 8.

Compressor 15, previously referred to, serves to raise the carbon dioxide to the pressure at which the endothermic conversion takes place. The carbon dioxide recovery may be carried out under substantially the same pressure as prevails at the outlet of the turbine, for example, about 50 pounds gauge.

Methane, or a gas containing 85 to 95 per cent methane, is obtained from a source not shown through a pipe 38 and is advantageously passed to the compressor 15 wherein it and the aforesaid carbon dioxide are raised to 250 lbs. pressure. Natural gas may be available at sufficiently high pressure so that it requires no further compression.

Steam at approximately the same pressure, namely about 250 pounds per square inch gauge, is obtained at least in part from the exchanger 10 through the pipe 12 and combines with methane in the discharge conduit 39 from the compressor 15.

Additional steam and carbon dioxide, if required, can be drawn from outside sources not shown in the drawing.

Methane, steam and carbon dioxide are combined in the conduit 39 prior to their introduction into the tubular endothermic reaction zone 8. The mol ratio of these reactants depends upon reaction temperature, type of catalyst, if any, and upon what molecular ratio of carbon monoxide to hydrogen is desired in the resulting synthesis gas. A reactant mixture containing a molecular ratio of two mols of methane to one each of carbon dioxide and steam gives a synthesis gas containing hydrogen and carbon monoxide in the molecular ratio of 2:1 at 1800° F. in the presence of nickel catalyst. A reactant mixture of one mol of methane to one mol of steam gives a synthesis gas comprising hydrogen and carbon monoxide in the approximate ratio of 3:1. A reactant mixture containing methane and carbon dioxide in the mol ratio of 1:1 under similar conditions yields synthesis gas containing hydrogen and carbon monoxide in the approximate ratio of 1:1. These relationships may be seen from the following equations:

$$2CH_4 + CO_2 + H_2O \rightleftharpoons 3CO + 6H_2$$

$$CH_4 + H_2O \rightleftharpoons CO + 3H_2$$

$$CH_4 + CO_2 \rightleftharpoons 2CO + 2H_2$$

It is apparent that the makeup of the resulting synthesis gas may be varied within the approximate mol ratio limits of hydrogen to carbon monoxide of 1:1 to 3:1 by varying the makeup of the reactants.

The reactant mixture is introduced into the coil 8 from the conduit 39. The coil 8 may be filled with nickel deposited on alumina which catalyzes the reaction of methane with carbon dioxide and steam. On passage through the coil 8, the reactants are raised to a temperature level in excess of 1600° F. through the heat supplied by the pressure combustion taking place on the exterior of the coil 8. The reactants are converted into carbon monoxide and hydrogen during passage through the coil.

A spray of water from a pipe 41 may be introduced into the hot products of the endothermic reaction as they leave the tube 8. The purpose of the water spray is to serve as a quench. The products of conversion proceed along a pipe 42 at a reduced temperature into a condenser 44 in which the steam present in the product is condensed. The fluid product then flows along a pipe 45 into a gas-liquid separator 46 in which condensed water is separated from the gaseous constituents. Water is discharged from the separator 46 through a pipe 47.

The normally gaseous constituents from which water has been separated leave the separator 46 through a pipe 48. This gas comprises mainly carbon monoxide and hydrogen in the desired molecular ratio which is ordinarily about 1:2. This synthesis gas is at an elevated pressure and is advantageously used directly in the production of liquid hydrocarbons in the gasoline range by contact with a catalyst containing a metal of the eighth group, such as iron.

The synthesis gas at an elevated pressure proceeds along the pipe 48 and is introduced into a synthesis reactor 49. In the reactor 49, synthesis gas is converted at an elevated pressure into products comprising mainly liquid hydrocarbons in the gasoline range. The products of reaction issue from the reactor 49 through a pipe 50 and are thereafter introduced into a separating and fractionating system, not shown.

A fluid bed type of reactor operated at about 250 pounds per square inch gauge pressure, at about 600° F. and using an unsupported iron catalyst is effective in preparing liquid hydrocarbons in the gasoline range. The composition of unsupported iron catalyst used under these conditions is approximately as follows: 93 to 95 per cent metallic iron, 3 to 6 per cent alumina and 0.2 to 2 per cent alkali metal oxide, such as potassium oxide.

Figure 2:
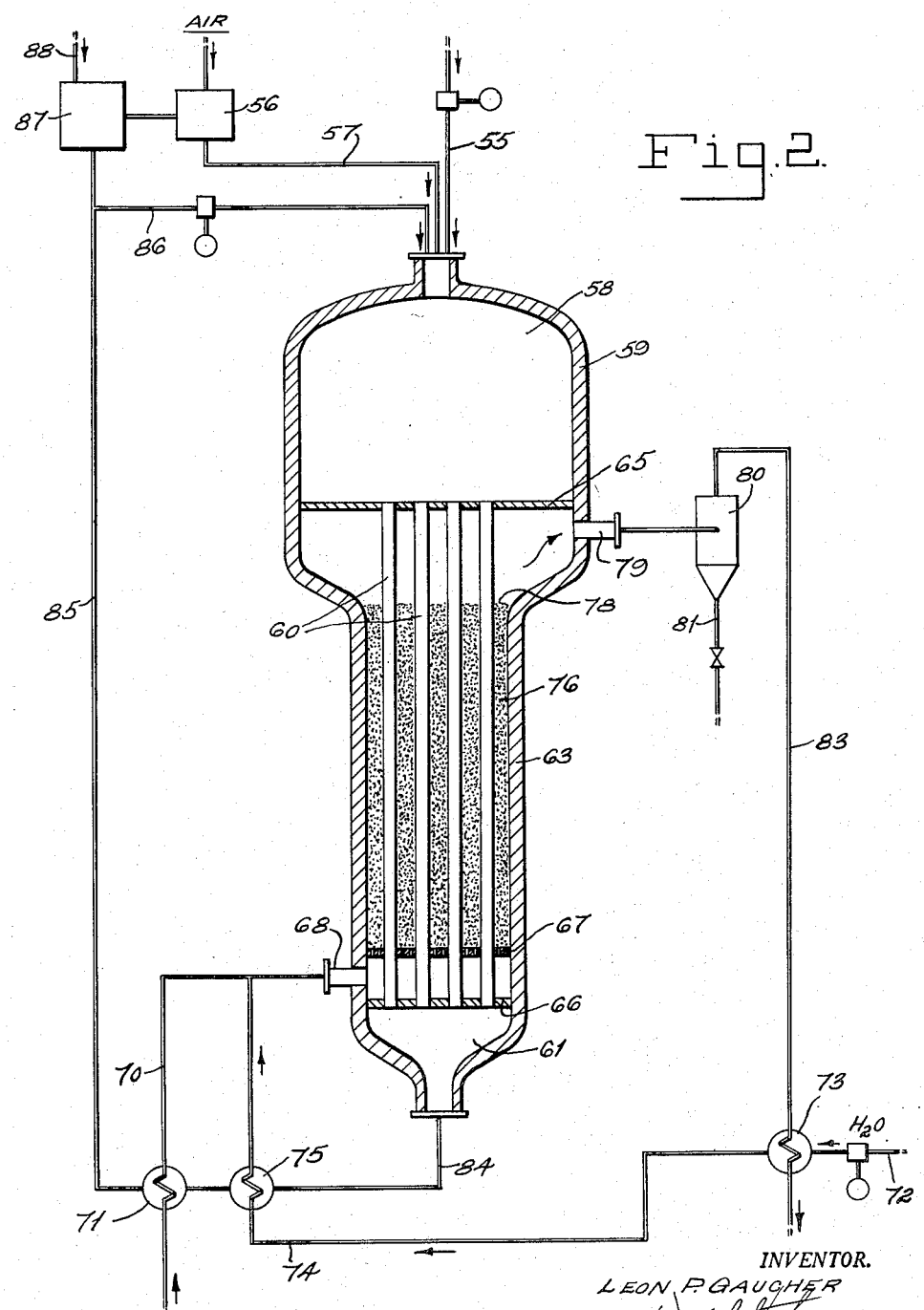

Figure 2 of the drawing presents a somewhat modified embodiment of the invention employing a fluid phase contact mass in the endothermic zone. Therein a fuel such as a natural gas or powdered coal is passed through pipe 55 simultaneously with the passage of an oxidizing gas such as air through compressor 56 and pipe 57, to a combustion zone 58 of a furnace 59. As before, the combustion zone is preferably maintained at a high pressure, for example, 250 p. s. i. g., and a temperature within the range from about 1800° to 3600° F.

Combustion is initiated within the upper enlarged cylindrical portion of the furnace 59 and completed within the vertical tubes 60, the burning reactants flowing downwardly therethrough and yielding a flue gas in the lower portion 61 of the furnace. In the present embodiment, the endothermic reaction zone surrounds the combustion tubes 60 within a vertical cylindrical chamber 63. More specifically, the endothermic reaction zone is situated intermediate of upper and lower tube plates 65 and 66 respectively, in the space about tubes 60.

Just above the lower tube plate 66, the tubes extend through a distributing plate 67, preferably formed of some porous refractory material such as sintered silica, alumina or the like. The distributing plate 67 may be alternatively a perforated or reticulated metal. The plates 66 and 67 accordingly define between them a header for the incoming reactants introduced through side arm 68. As said before, the reactant hydrocarbon may comprise preheated methane flowing through the side arm 68 from any convenient source not shown, through inlet pipe 70 and heat exchanger 71. Water injected through pipe 72 into waste heat boiler 73 supplies steam through pipe 74 and preheater 75 into admixture with the methane in the header.

The reactant mixture at reaction temperature passes upwardly through the distributing plate 67 through a dense fluid phase of solid particle catalyst surrounding the combustion tube 60 and indicated by the reference numeral 76. It is to be understood that the linear upflow velocity of the reactant is adjusted with due regard to the settling rate of the catalyst particles such that the uniform dense phase rises to a pseudo-liquid level represented by the numeral 78.

In the disengaging space between the upper level 78 of the contact mass and the upper tube plate 65, the effluent product stream is collected and flows outwardly through side arm 79 to a separator such as the cyclone 80. Obviously, any magnetic or electrostatic or any other convenient form of separator may be substituted at this point to remove any inevitable small amount of entrained catalyst particles which are discharged through standpipe 81. The product gases comprising essentially hydrogen and carbon monoxide, at a temperature of, for example, 2000° to 2500° F., flow through pipe 83 to waste heat boiler 73, from which they are discharged for subsequent utilization as in the previous embodiment.

From the foregoing, it will be apparent that the high pressure combustion going on within the tubes 60 continuously transfers thermal energy through the relatively thin tube walls into the fluid phase particles within an endothermic reaction zone under a substantially identical pressure. Accordingly, heat transfer is effected with minimum interference from the intervening tube walls and maximum rate of heat transfer to the contact particles. Since the rate at which the reaction can be effected is normally limited by the transfer of heat energy into the endothermic reaction zone, the present arrangement substantially multiplies the capacity of the endothermic reaction zone and makes possible the conversion of phenomenally larger quantities of reactants than is possible where the contact mass is packed or otherwise disposed in the reaction zone to form a fixed bed. The phenomenal improvement in heat transfer following from the provision of the fluid phase of particles is, however, present, irrespective of whether the particles are catalytic or inert, and accordingly, a noncatalytic fluid phase is contemplated under reaction conditions where a catalyst is not requisite.

For the purpose of permitting the regulation of peak combustion temperatures to prevent undesirable overheating within the combustion zone, provision is made for recycling a portion of the product flue gas. To this end, the flue gas collecting in the lower chamber 61 of the furnace passes through pipe 84 and after passing through preheating exchangers 75 and 71 as indicated, moves through conduit 85 to branch line 86, leading to the inlet of the combustion chamber where it mixes with the fuel and oxygen streams of pipes 55 and 57 in the initial combustion chamber 58. The flue gas over and above that required for temperature control continues into expansion engine 87, furnishing the energy to drive compressor 56. The final flue gas is vented at an appropriate lower temperature through pipe 88.

Obviously, from the foregoing, the expansion engine may operate to supply mechanical energy as needed to compress other streams, as for example, the fuel supplied to the combustion zone where gaseous fuel is employed.

In place of the water vapor stream of inlet pipe 74, carbon dioxide, as indicated above, may be substituted in whole or in part.

In view of the critical requirement that the endothermic reaction zone be maintained continuously under a pressure substantially the same as that prevailing in the high pressure combustion zone, it is understood that in practical operation, suitable instrumentalities will be provided to maintain this condition. In view, however, of the variety of forms of equipment and the conventional principles involved, it is evident that the details thereof are neither appropriate or necessary.

In the description of the invention, natural gas has been mentioned as the fuel gas burned in the exothermic zone. However, other carbonaceous materials, such as fuel oil, shale oil, etc., may be used.

Obviously, many modifications and variations of the invention, as hereinbefore set forth, may be made without departing from the spirit and scope thereof and, therefore, only such limitations should be imposed as are indicated in the appended claims.

I claim:

1. A process for continuously generating carbon monoxide and hydrogen which comprises passing a stream of a hydrocarbon gas and a reactant selected from the group consisting of steam, carbon dioxide and a mixture thereof into a reaction zone maintained at a temperature above 1,200° F. and a pressure above about 150 pounds per square inch gauge into contact with a bed of solid contact material in particle form maintained in dense fluid phase condition by the flow of reactants therethrough, effecting reaction between said hydrocarbon and said reactant within said reaction zone to form carbon monoxide and hydrogen, subjecting carbonaceous material to combustion in a separate combustion zone maintained at a temperature in the range of 1,800 to 3,600° F. and a pressure substantially equivalent to the pressure in said reaction zone and passing the resulting combustion gases maintained under said elevated pressure through said fluidized bed of solid contact material in indirect heat exchange therewith to supply heat to said reaction zone.

2. In a process for generating carbon monoxide and hydrogen from a plurality of reactants consisting of a hydrocarbon gas and a reactant selected from the group consisting of steam, carbon dioxide and a mixture thereof, the improvement comprising introducing said reactants into the lowermost portion of a reaction zone within a pressure vessel, maintaining a dense phase fluidized bed of solid contact material within said reaction zone, said bed occupying the lower portion of the reaction zone and having an upper surface below the uppermost portion of said reaction zone, introducing said reactants at a rate sufficient to maintain dense phase fluidization of said contact material, maintaining a pressure above about 150 pounds per square inch gauge and a temperature above 1200° F. in said reaction zone, subjecting carbonaceous fuel to combustion in a separate combustion zone within said pressure vessel maintained at a pressure substantially equivalent to the pressure in said reaction zone, and passing the resulting combustion gases while under said pressure into said fluidized bed of solid contact material in indirect heat exchange therewith, thereby supplying heat to said reaction zone.

LEON P. GAUCHER.

References Cited in the file of this patent

UNITED STATES PATENTS

| Number | Name | Date |
|---|---|---|
| 1,903,845 | Wilcox | Apr. 18, 1933 |
| 1,959,151 | Beekley | May 15, 1934 |
| 2,389,636 | Ramseyer | Nov. 27, 1945 |
| 2,399,450 | Ramseyer | Apr. 30, 1946 |
| 2,425,754 | Murphree et al. | Aug. 19, 1947 |
| 2,478,912 | Garbo | Aug. 16, 1949 |
| 2,547,135 | Mercier | Apr. 3, 1951 |

FOREIGN PATENTS

| Number | Country | Date |
|---|---|---|
| 310,686 | Great Britain | May 2, 1929 |
| 604,373 | Great Britain | July 2, 1948 |